US006401785B1

(12) United States Patent
Van Geijlswijk

(10) Patent No.: US 6,401,785 B1
(45) Date of Patent: Jun. 11, 2002

(54) DEVICE FOR APPLYING A DECORATION TO A CRATE

(75) Inventor: Petrus Johannus Van Geijlswijk, Voorschoten (NL)

(73) Assignee: Heineken Technical Services B.V., Zoeterwoude (NL)

(*) Notice: Subject to any disclaimer, the term of this patent is extended or adjusted under 35 U.S.C. 154(b) by 0 days.

(21) Appl. No.: 09/720,034

(22) PCT Filed: Jun. 24, 1999

(86) PCT No.: PCT/NL99/00391

§ 371 (c)(1), (2), (4) Date: Jan. 22, 2001

(87) PCT Pub. No.: WO97/67139

PCT Pub. Date: Dec. 29, 1999

(30) Foreign Application Priority Data

Jun. 24, 1998 (NL) ............................................ 1009473

(51) Int. Cl.[7] ................................................ B32B 31/00

(52) U.S. Cl. ........................ 156/497; 156/542; 156/556

(58) Field of Search .......................... 156/82, 230, 234, 156/238, 497, 538, 539, 540, 541, 542, 556

(56) References Cited

U.S. PATENT DOCUMENTS

| | | | | |
|---|---|---|---|---|
| 4,383,880 A | | 5/1983 | Guertsen et al. | 156/361 |
| 4,452,659 A | * | 6/1984 | Guersten et al. | 156/361 |
| 5,250,129 A | | 10/1993 | Twele | 156/64 |

FOREIGN PATENT DOCUMENTS

| | | |
|---|---|---|
| DE | 33 10 825 | 9/1984 |
| GB | 2 262 912 | 7/1993 |
| WO | WO 97 34810 | 9/1997 |

* cited by examiner

*Primary Examiner*—James Sells
(74) *Attorney, Agent, or Firm*—Sughrue Mion, PLLC

(57) ABSTRACT

The Invention relates to a device for applying a decoration to containers such as for example, crates, bottles or cans. The decoration comprises an image transfer label supplied to the containers on a carrier strip. The carrier strip is pressed laterally, by means of a pressure roller, against the containers, which are fed past the pressure rollers. A heating device, such as, preferably, a hot air blower, heats the image transfer label on the application side of the carrier strip. Preferably, a flat stream of air is blown, by the hot air blower, against the line of contact between the image transfer label and the container. As a result of the use of highly local heating of the application side of the carrier strip according to the present invention, activation of the image transfer label is obtained without the carrier strip or the surface of the container being heated to a substantial extent. As a result, undesired stretch in the carrier strip is prevented and the temperature of the image transfer label can remain relatively low, so that the quality of the inks is retained and complete transfer to the containers is possible. The pressure roller is also able to operate at relatively low temperatures, so that a long life thereof is obtained. As a result of the highly local heating oil the application side, the contact time required for transfer of the image transfer label is reduced substantially, so that a high throughput is possible.

13 Claims, 2 Drawing Sheets

DEVICE FOR APPLYING A DECORATION TO A CRATE

Figure 1:
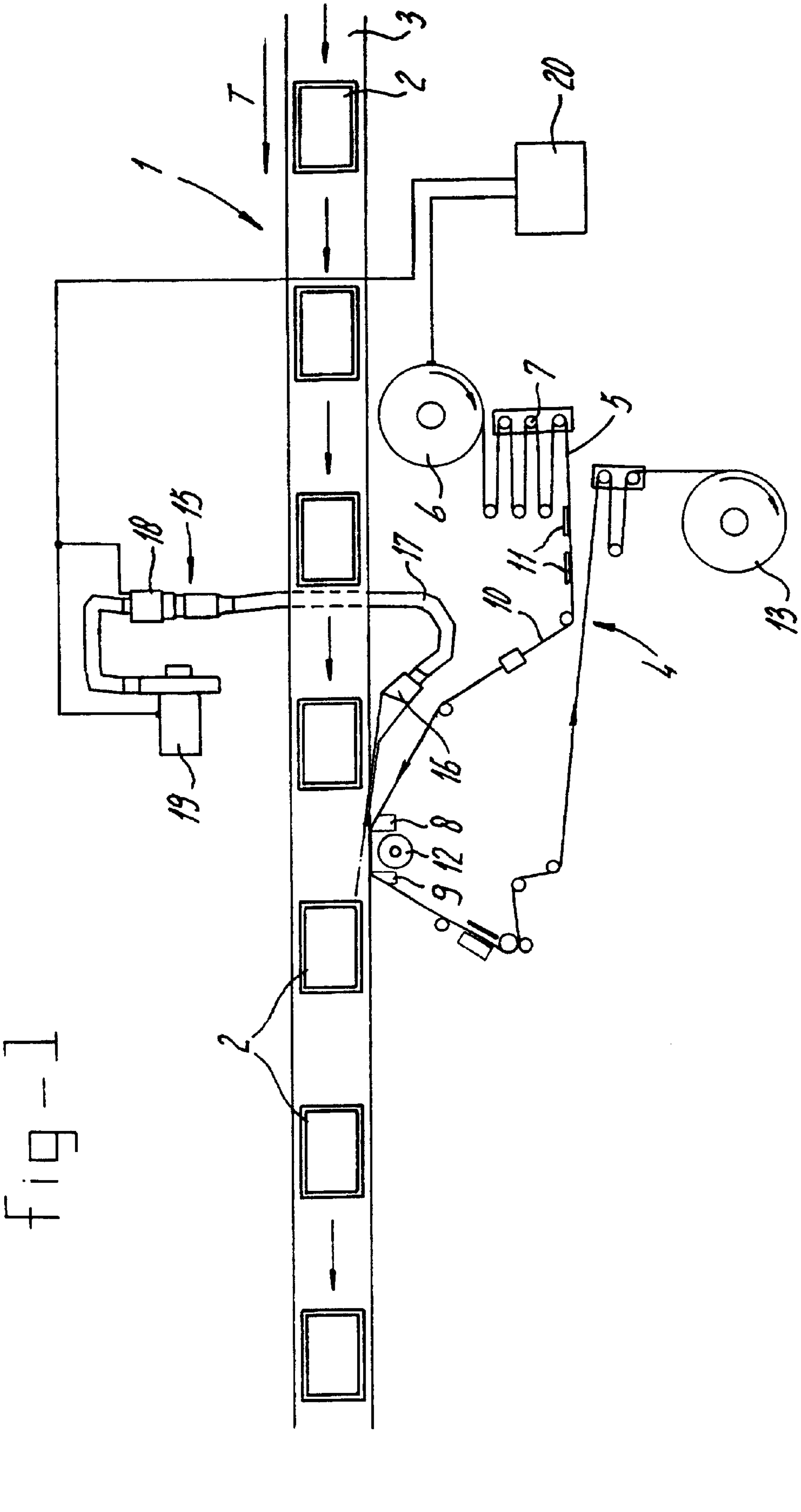

The invention relates to a device for applying a decoration to containers, comprising a conveyor for feeding containers in a transport direction, a feed device for feeding a carrier strip to an application station, which carrier strip is provided on an application side, which faces the conveyor, with an image transfer label to be transferred to the containers, wherein for receiving the carrier strip, the application station comprises a guide for supporting the carrier strip, such that the carrier strip makes an acute angle with respect to the direction of transport, as well as a pressure element for pressing the carrier strip against the containers.

A device of this type is disclosed in International Patent Applications nos. WO 97/35290, WO 97/35291, WO 97/35292 and European Patent Application no. 96200780.3 in the name of the Applicant. These applications describe a device for applying washable image transfer labels which are applied from a paper or polypropene carrier strip to containers such as, for example, plastic crates. With this device the crates are fed to the application station on a conveyor. The carrier strip with the image transfer labels thereon is unwound from a stock roll and fed over a heated pressure roller in the application station, which pressure roller is movable to and fro perpendicularly to the direction of transport of the crates. Prior to transfer of the image transfer label from the carrier strip, during which the image transfer label is removed from the carrier strip while heat and pressure are supplied through the pressure element, the surface of the crates is treated with a flame to give said surface the correct surface tension. Furthermore, a preheating step is carried out on the crates by means of a quartz heating element in order to bring the crates to the correct temperature, the heat-activatable adhesive of the image transfer labels being activated.

Especially when applying heat-activated image transfer labels, which, for example, are provided with heat-activated adhesive, to heat-sensitive products such as, for example, PET bottles or plastic crates, the problem arises that the surface of the containers cannot be heated too much because of the resulting deformation. However, the carrier strip, which can have been made of paper or plastic, can likewise not be heated too much since this can damage the carrier strip or the image transfer label and undesirable stretch can occur, which leads to incorrect alignment of the image transfer labels with respect to the containers to be printed furthermore too great a supply of heat to the carrier strip will lead to the inks of the image transfer label becoming soft, so that the image transfer label is not detached as a single element from the carrier strip. Furthermore, it has been found that the temperature range of the pressure roller is restricted in connection with the life of this roller, which becomes shorter when higher temperatures are used.

It is therefore an aim of the present invention to provide a device of the abovementioned type with which the supply of heat to the carrier strip is controlled such that a rapid and complete transfer of the image transfer label to the containers is possible, without the containers having to be preheated to relatively high temperatures. A further aim of the present invention is to provide a device of this type with which the contact time between the pressure element and the carrier strip can be reduced, with which the risk of overheating the carrier strip is avoided, with which the stretch of the carrier strip remains within accurately defined limits and with which complete transfer of the image transfer label can take place in a reliable and reproducible manner. It is also an aim of the present invention to provide a device of the abovementioned type with which a long life of the pressure element is ensured.

To this end the device according to the present invention is characterised in that a heating device is incorporated close to the pressure element to dispense heat to the application side of the carrier strip in a preheating region of the carrier strip located upstream of the pressure element.

By subjecting the application side of the carrier strip to highly local heating at the time of transfer, just before the image transfer label is brought into contact with the relevant container by the pressure element activation of (the adhesive of) the image transfer label is obtained without the carrier strip or the surface of the container having to be heated to any substantial extent. As a result undesirable stretch in the carrier strip is prevented and the temperature of the image transfer label can remain relatively low, so that the quality of the inks is retained and complete transfer to the containers is possible. The pressure roller is also able to operate at relatively low temperatures, said roller, for example, not having to be heated at all or being heated only to a slight extent. Furthermore, as a result of the highly local heating on the application side of the carrier strip for complete transfer of the image transfer label, the contact time required between the pressure element and the carrier strip is shortened, so that the throughput rate can be increased appreciably, for example to 500 containers per minute or more.

The heating device can have been constructed as a heated plate, rod or roller that is accommodated between the containers and the carrier strip. Preferably, however, the heating device is equipped to heat the image transfer labels without mechanical contact with the carrier strip and comprises, for example, a radiant heating element or a burner.

The containers can be wooden, plastic or metal crates, trays or other packaging means which are generally used in the packaging industry, as well as plastic or glass bottles and the like. The invention can also be applied to metal cans such as are generally used in the drinks industry.

The image transfer label on the carrier strip can be a washable image transfer label as described in the abovementioned prior art or can be permanently applied to the container as described in European Patent EP-B 0 441 858. In this context a setting top coat can be applied on top of the image transfer label after applying the image transfer label to the container.

Preferably, the heating device according to the invention comprises a hot air blower directed towards the guide. It has been found that very controlled local heating of the image transfer label can take place by means of a directed stream of air. By using a slit-shaped outflow nozzle only the surroundings of the image transfer label in the immediate vicinity of the line of contact between the image transfer label and the container, at the location of the pressure roller, are heated. The amount of heat can also be controlled very accurately in a simple manner by adjusting the volume of the stream of air, which can be switched off rapidly if the feed of the carrier strip is interrupted. Increased safety for the operators is achieved as a result since the hot air blower cools down to ambient temperature very rapidly after switching off. The outflow nozzle of the hot air blower is relatively compact and can be mounted in a simple manner between the carrier strip and the conveyor.

The conveyor for the containers can comprise a linear conveyor or can be a rotary, conveyor which rotates counter to the direction of transport of the carrier strip, the containers, rotating about their own axis in the direct of transport, being supported on the conveyor, as described in International Patent Application WO 97/13645.

In a further embodiment of the device according to the invention, the pressure element is movable to and fro transversely to the direction of transport between a retracted position and an application position located close to the conveyor for the containers. This embodiment is characterised in that the hot air blower dispenses the stream of air at an acute blowing angle with respect to the direction of transport When the pressure element is in the retracted position said stream of air will be at least partially directed along the carrier strip so that heating of the carrier strip is substantially reduced at that point in time. When the carrier strip is moved by the pressure element towards the container and the air gap between the container and the carrier strip decreases, the stream of air will come into contact with the application side of the carrier strip and heat this. When the carrier strip has been placed in contact with the container, the stream of air is blown into the enclosed space that is delimited by the carrier strip and the container, so that substantial local heating of the image transfer label takes place, especially along the contact line between the image transfer label and the container, which contact line faces the stream of air.

The blowing angle of the stream of air is between 150° and 450°, preferably between 250° and 30°. The blowing angle of the stream of air can be adjustable by means of, for example, arranging the outflow nozzle such that it is hingeable or by means of suspending said outflow nozzle from a flexible hot air supply tube. The air temperature is, for example, between 100° C. and 350° C. The heating element and the fan in the hot air blower are preferably set up outside the range of the carrier strip, for example at a side of the conveyor which is located opposite the application station. The heating device according to the invention is connected to a control unit which switches off the heating device if the feed of the carrier strip is interrupted.

Figure 2:
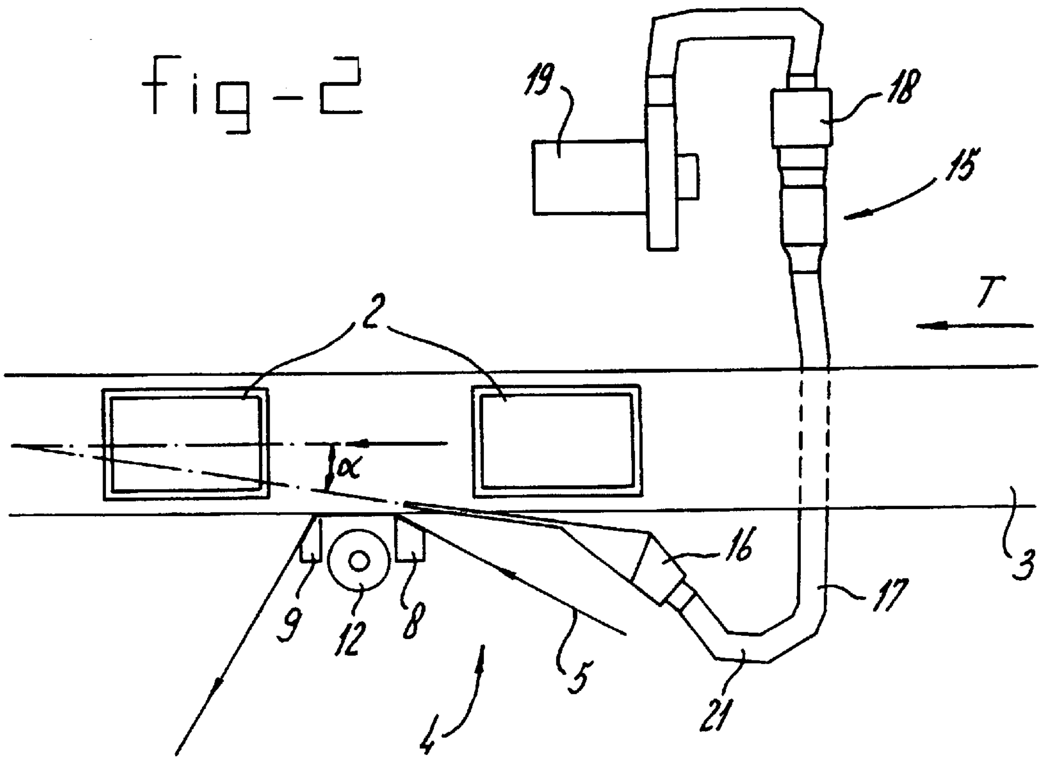
Figure 3:
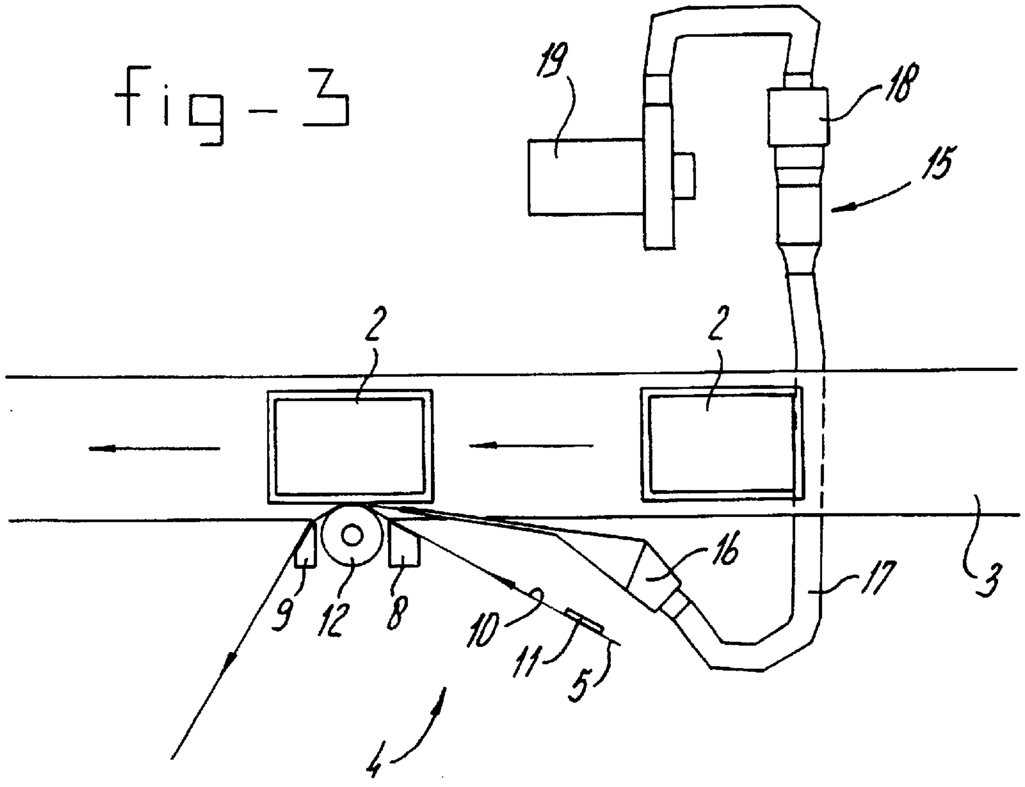

One embodiment of the device according to the present invention will be explained in more detail by way of example with reference to the appended drawings In the drawing:

FIG. 1 shows a diagrammatic plan view of a device for applying an image transfer label to crates, FIG. 2 shows a detail of the heating device according to FIG. 1 with the pressure element in the retracted position and FIG. 3 shows the device according to FIG. 2 with the pressure element in the application position.

FIG. 1 shows a device 1 for applying an image transfer label to containers, such as crates 2, which are fed on a conveyor belt 3 in the direction of transport T. The crates 2 are fed to an application station 4 where an image transfer label is applied to the wall of the crates 2. To this end a carrier strip 5 is unwound from a stock reel 6 and conveyed via a tensioner 7 to guides 8, 9 The carrier strip 5 is provided on its application side 10 with an image transfer label 11 in the form of patterns a uniform distance apart which have to be transferred from the carrier 5 to the crates 2. The image transfer label 11 can have been provided, on the side facing the crates 2, with a heat activated adhesive A pressure roller 12 is arranged between the guides 8, 9, which pressure roller is movable to and fro transversely to the direction of transport T by means of a hydraulic device, which is not shown in the figure. In FIG. 1 the pressure roller 12 is shown in its retracted position, so that the carrier strip runs free from the pressure roller and is able to pass over the guides 8, 9. The empty strip of carrier material is wound on a take-up reel 13 downstream of the pressure roller 12.

To heat the image transfer labels 11 on the application side 10 of the carrier strip 5, a hot air blower 15 is incorporated which has an outflow nozzle 16 that is arranged between the conveyor belt 3 and the carrier strip 5, close to the guide 8 located upstream. The outflow nozzle 16 is connected via a flexible tube 17 to a heat gun 18 and to a fan 19. The outflow nozzle 16 is suspended from a flexible section 21 of the tube 17 of the device 15 so that the position of the outflow nozzle 16 relative to the direction of transport can be varied. The heating device 15 and the stock reel 6 are connected to a microprocessor 20 which switches off the heating device 15 if the feed of the carrier strip 5 from the stock reel 6 is interrupted.

As is shown in FIG. 2, the outflow nozzle 16 is of slit-shaped construction, the direction of the slit being transverse to the plane of the drawing.

The blowing angle a of the stream of air dispensed by the outflow nozzle 16 with respect to the direction of transport T is about 30°. The width of the outflow nozzle 16 is, for example, 10 mm for a length of approximately 500 mm. The pressure of the air dispensed by the outflow nozzle 16 is approximately 1.5 bar. The outflow nozzle is provided with a number of holes, located along a line, which have a diameter of 2 mm, which holes have been made every 10 mm in order to obtain a flat air flow. As shown in FIG. 2, when the pressure roller 12 is in the retracted position the stream of air is blown along the carrier strip 5 so that in this case the latter is not heated.

As shown in FIG. 3, when the carrier strip 5 is in the application position the pressure roller 12 presses against a crate 2 passing by the pressure station 4 In this case the stream of air from the nozzle 16 impinges on the contact line between the carrier strip 5 and the crate 2, which is located perpendicular to the plane of the drawing, As a result highly advantageous local heating of the image transfer label 11 on the application side 10 of the carrier strip 5 can take place.

In one embodiment polyethene crates are heated to a temperature of between 60° C. and 70° C. upstream of the heating device 15. The crates are fed at a speed of 31 cm/s or 40 crates per minute past the application station 4. During this operation the carrier strip 5 is pressed against the crates 2 by a pressure roller 12 at a temperature of 110° C.–150° C. The carrier strip 5 carries image transfer labels, for example of the type as supplied by Zweckform. A stream of air of 600 l/min at a temperature of 100° C.–350° C. is blown under a pressure of 80 mbar against the carrier strip 5 by the heating device 15. Accurate transfer of the image transfer labels 11 from the carrier strip 5 to the crates 2 is possible with a very high throughput and at relatively low temperatures of the pressure roller 12.

Although the invention has been described with reference to the application of an image transfer label to plastic crates, the invention is not restricted to this and can be employed for a wide variety of packaging materials known in the packaging industry. Furthermore, in place of a hot air blower it is also possible to use other heating devices such as heating devices which make contact with the application side of the carrier strip 5 or radiant heating devices such as, for example, heat lamps. Furthermore, it is also possible to omit the guides 8, 9, so that the carrier strip is continuously supported by the pressure roller 12.

What is claimed is:

1. Device (1) for applying a decoration to containers (2), comprising

- a conveyor (3) for feeding containers in a transport direction (T),
- a feed device (6, 7, 13) for feeding a carrier strip (5) to an application station (4), which carrier strip (5) is provided on an application side (10), which faces the conveyor (3), with an image transfer label (11) to be transferred to the containers,
- an application station (4) for receiving the carrier strip (5), the carrier strip (5) making an acute angle with respect to the direction of transport (T), comprising a pressure element (12) for pressing the carrier strip (5) against the containers (2), characterised in that a heating device (15) facing the application side (10) is incorporated close to the pressure element (12) to dispense heat to the application side (10) of the carrier strip (5) in a preheating region of the carrier strip (5) located upstream of the pressure element (12).

2. Device according to claim 1, characterised in that the application station (4) comprises a guide (8) for supporting the carrier strip, the heating device (15) being positioned upstream of the guide (8), in the vicinity thereof.

3. Device (1) according to claim 1, characterised in that the heating device (15) is equipped to heat the application side (10) of the carrier strip (5) without mechanical contact with the carrier strip.

4. Device according to claim 1, characterised in that the heating device (15) comprises a hot air blower (16, 17, 18, 19) facing the pressure element (12).

5. Device (1) according to claim 4, characterised in that an outflow nozzle (16) of the hot air blower (16, 17, 18, 19) is positioned between the carrier strip (5) and the conveyor (3).

6. device (1) according to claim 5, characterised in that the hot air blower (16, 17, 18, 19) has a slit-shaped outflow nozzle (16), so that a relatively narrow stream of air which is at least equally as wide as the image transfer label (11) on the carrier strip (5) is formed in the longitudinal direction of the carrier strip (5).

7. Device (1) according to claim 4, wherein the pressure element (12) is movable to and fro, transversely to the direction of transport (T), between a retracted position and an application position located close to the conveyor (3) for the containers (2), characterised in that the hot air blower (16, 17, 18, 19) dispenses the stream of air at an acute blowing angle (α) with respect to the direction of transport (T) of the containers, which stream of air is directed at least partially along the carrier strip (5), without making contact therewith, when the pressure element (12) is in the retracted position and terminates in the gap between a relevant container (2) and the pressure element (12) when the pressure element (12) is in the application position.

8. Device (1) according to claim 7, characterised in that the blowing angle (α) of the stream of air is between 15° and 45°, preferably between 25° and 30°.

9. Device (1) according to claim 7, characterised in that the blowing angle (α) of the stream of air is adjustable.

10. Device (1) according to claim 4, characterised in that the temperature of the stream of air dispensed by the hot air blower (16, 17, 18) is between 100° C. and 350° C., preferably between 100° C. and 200° C.

11. Device (1) according to claim 4, characterised in that the heating device (16, 17, 18) contains a fan (19) and a heating element (18) which are arranged outside the range of the carrier strip (5), as well as a flexible tube (21) which is connected to the fan (19) and terminates in the outflow nozzle (16).

12. Device (1) according to claim 1, characterised in that the heating device (18) is connected to a control unit (20) for switching off the heating device (18) if the feed of the carrier strip (5) is interrupted.

13. Device (1) according to claim 1, characterised it that the pressure element (12) is heated.

* * * * *